United States Patent [19]
Lenhart

[11] Patent Number: 6,042,307
[45] Date of Patent: Mar. 28, 2000

[54] CONTROLLED SPEED AIR CONVEYOR FOR UNSTABLE ARTICLES

[75] Inventor: Ronald A. Lenhart, Lakewood, Colo.

[73] Assignee: Crown Simplimatic, Incorporated, Lynchburg, Va.

[21] Appl. No.: 09/126,365

[22] Filed: Jul. 30, 1998

[51] Int. Cl.⁷ ................................................. B65G 53/16
[52] U.S. Cl. .................................. 406/88; 406/86; 226/7; 226/97.3
[58] Field of Search ............................ 406/86, 88; 226/7, 226/97.3

[56] References Cited

U.S. PATENT DOCUMENTS

| | | | |
|---|---|---|---|
| 3,105,720 | 10/1963 | Barker | 406/88 |
| 3,180,688 | 4/1965 | Futer | 406/88 |
| 3,385,490 | 5/1968 | Malmgren et al. | 226/7 |
| 3,437,335 | 4/1969 | Gluskin | 271/8.1 |
| 3,475,058 | 10/1969 | Sanders | 406/88 |
| 3,733,056 | 5/1973 | Fong | 366/107 |
| 4,014,576 | 3/1977 | Druschel et al. | 406/38 |
| 4,033,555 | 7/1977 | Fong | 366/101 |
| 4,165,132 | 8/1979 | Hassan et al. | 406/10 |
| 4,456,406 | 6/1984 | Lenhart | 406/88 |
| 4,500,229 | 2/1985 | Cole et al. | 406/88 |
| 4,730,955 | 3/1988 | Lenhart | 406/88 |
| 4,732,513 | 3/1988 | Lenhart | 406/88 |
| 4,744,702 | 5/1988 | Wiseman et al. | 406/88 |
| 5,037,245 | 8/1991 | Smith | 406/88 |
| 5,209,387 | 5/1993 | Long et al. | 226/97.3 |
| 5,222,840 | 6/1993 | Ingraham et al. | 406/88 |
| 5,357,688 | 10/1994 | Christensen | 34/369 |
| 5,466,096 | 11/1995 | Hilbish et al. | 406/84 |
| 5,478,173 | 12/1995 | Lenhart | 406/88 |
| 5,549,423 | 8/1996 | Lenhart | 406/86 |
| 5,611,648 | 3/1997 | Lenhart | 406/88 |

*Primary Examiner*—Christopher P. Ellis
*Assistant Examiner*—Richard Ridley
*Attorney, Agent, or Firm*—Fields and Johnson, P.C.

[57] ABSTRACT

The method and apparatus of this invention include first and second sets of louvers which extend through the conveying surface for creating downstream and upstream force vectors of air which serve the dual function of creating a low pressure area under unstable, lightweight, upright containers to hold them in an upright position while simultaneously enveloping the side walls of the containers in vertical columns of air which moves along a substantially vertical force vector to further assist in holding them in an upright position as they move from an upstream location to a downstream location along the surface of an air conveyor. This is accomplished by the use of lance and coined louvers arranged in a predetermined pattern to provide both upstream and downstream force vectors of air as well as substantially vertical force vectors of air. Alternatively, an array of trapezoidal louvers can be used in conjunction with an interspersed array of vertical openings in a deck plate to provide the same dual function. The first and second set of louvers provide both upstream and downstream air volumes. The downstream volume of air is greater than the upstream volume of air so that the sets of louvers create substantially a same net amount of air volume directed to the downstream location at any incremental location from the upstream location to the downstream location. This causes a plurality of containers move at a controlled uniform speed along the conveyor surface.

27 Claims, 6 Drawing Sheets

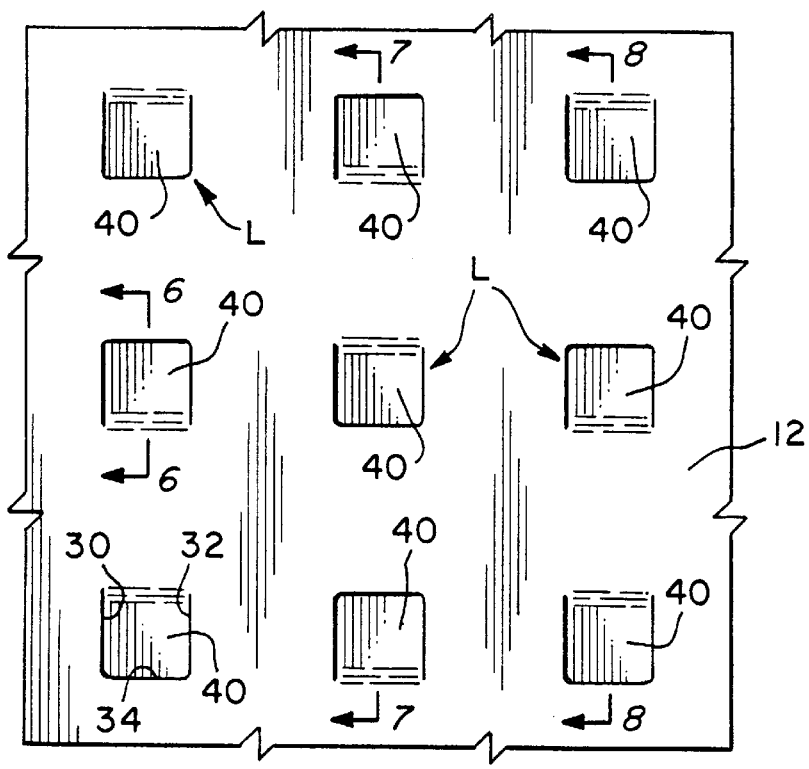
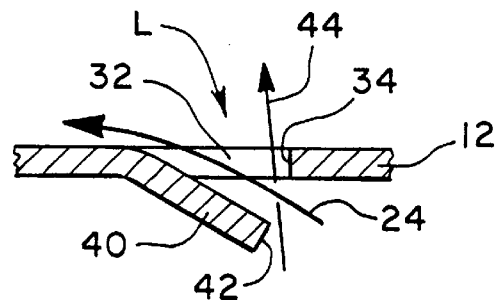
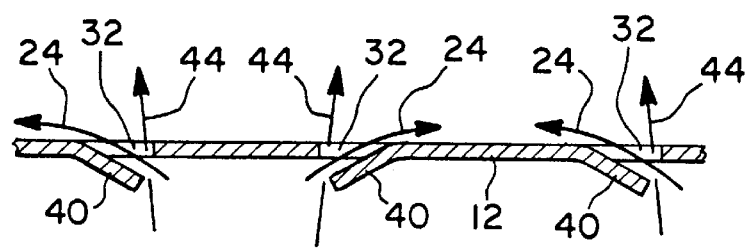
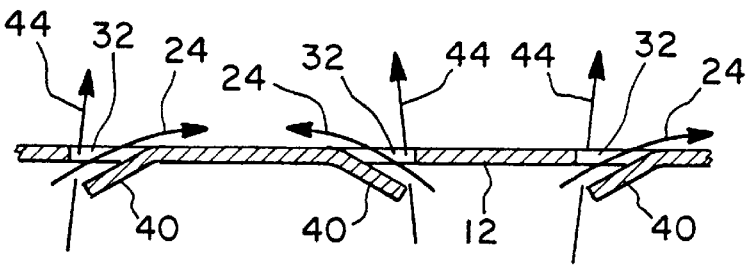

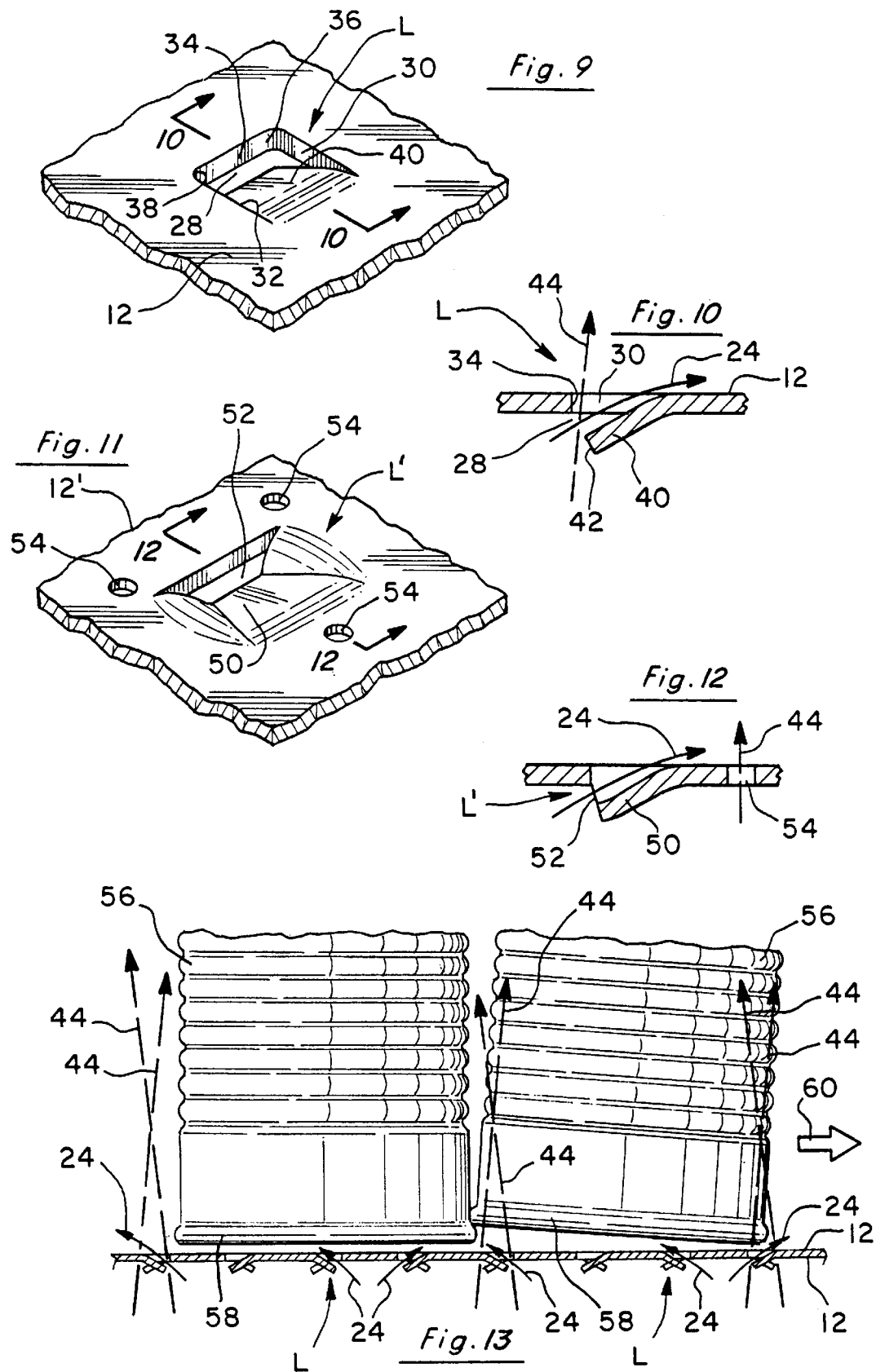

CONTROLLED SPEED AIR CONVEYOR FOR UNSTABLE ARTICLES

TECHNICAL FIELD

This invention relates to an air conveyor apparatus for use with generally unstable, upright, lightweight containers and more particularly to a conveyor which controls the conveying speed of the containers whether en masse or in a sparse or individual flow of containers.

BACKGROUND ART

In recent years, air conveyors have become popular for conveying lightweight containers, such as cylindrical lightweight beverage containers, both during the manufacturing of the containers and during the filling operation. Such conveyors have enjoyed considerable success because they allow the conveying of the containers at a much higher speed than was possible with mechanical conveyors. These air conveyors have used, in various forms, air jets and louvers for moving the containers along the conveying surface. The angle at which air is introduced to the conveying surface has included jets or louvers directing the air parallel to the direction of movement as well as various angles transversely to the direction of movement. In general, it has been the intent of these devices to use the blowing force of the air to move the containers in the desired direction.

Also, devices have been developed by applicant in which air is supplied through air jets in a manner to take advantage of the Coanda Effect to cause the air to move along the surface of the conveyor and therefore along the lower surface of the container on the conveyor. This effect, together with utilizing the Bernoulli Principle results in low pressure in the areas at which the air flows at the highest velocity so as to maneuver the containers in response to changes in air pressure rather than relying on the ability of the device to blow the containers in the desired direction. These principles have been used to create desired high and low pressure areas between adjacent containers to regulate their flow.

Barker, U.S. Pat. No. 3,105,720, shows the use of louvers at opposite ends of cylindrical containers for moving them vertically from one conveyor to another.

Futer, U.S. Pat. No. 3,180,688, discloses a mass conveyor which utilizes a series of louvers and vertical jets. The vertical jets suspend the containers above the conveyor while the louvers provide a downstream propelling force for moving the containers in the downstream direction.

Malmgren et al., U.S. Pat. No. 3,385,490, discloses a device for conveying web or sheet material along a conveyor in which louvers are provided which are angled inwardly from the outboard edges of the conveyor toward the center. An exhaust grid is provided at the center of the device for evacuation of air. This device is intended to center a sheet of material and convey it downstream due to the downstream force component of the air passing through the louvers. The inboard component of the air from the louvers is intended to be equal on both sides and therefore center the sheet material over the conveyor.

Fong, U.S. Pat. Nos. 3,733,056 and 4,033,555, each disclose a conveyor for fluidizing particulate material and utilizes louvers pointed in both a downstream direction and a direction substantially transversely to the direction of movement.

Hassan, et al. U.S. Pat. No. 4,165,132, discloses an air conveyor for conveying semi-conductor wafers wherein air jets are provided at an inboard angle from the side edges of the conveyor for suspending and centering the wafers over the conveyor. These jets also create a downstream force component which moves the wafer along the conveyor in the downstream direction.

Lenhart, U.S. Pat. No. 4,456,406, discloses a mass conveyor requiring a top cover and utilizes the formation of high pressure areas between containers to form air barriers for the containers to maintain them in a loose separate condition as they move through the conveyor. This is to minimize banging of the containers against each other and potential damage to them due to this banging action.

Lenhart, U.S. Pat. No. 4,732,513, provides a coverless air conveyor in which jets are provided through the conveying surface in a substantially vertical direction with a slight downstream tilt. Side walls are provided to form air dams to create a flowing body of air which enveloped and lifted the respective containers and moved them at a desired speed. However, if any adjustment is desired in the speed of movement of the mass of containers, it is necessary through dampers to vary the volume of air passing through the jets.

All of the foregoing inventions are suitable for their intended purposes. However, in order to control the flow of the containers on the conveyor, it is necessary to provide dampers at various positions along the plenum in order to control the amount of air issuing through the air jets or louvers of any particular location along the conveying surface. This is necessary in order to change the speed of the movement of the containers from one portion of the conveyor to the next to minimize potential damage to the containers as they move from one operative station to another. When using dampers in an effort to control the speed of a container, as the static pressure is varied upward and downward, the velocity from the deck louvers varies accordingly, and as the velocity varies the volume also varies. This makes control very difficult because of the two parallel variables. If the pressure is set too low in an attempt to slow the speed of the container, the container will not be levitated sufficiently above the deck surface and cannot be conveyed. Conversely, if the pressure is set too high, in order to convey the container at the higher speed, the container will be levitated too high above the deck and may wobble, so that it does not flow smoothly down the air conveyor and may tip over, creating a jam along the conveyor.

Furthermore, with the mass air conveyors discussed above, as a container moves from an upstream location to a downstream location, the volume of air acting on each container increases thereby tending to move the containers at greater and greater speeds, toward a terminal velocity. This is particularly true with single or sparse containers moving along the conveyor. Such a condition can result in containers striking each other with sufficient force to cause damage to fragile containers, such as beverage containers.

Lenhart U.S. Pat. No. 5,549,423 provided a solution to these problems. An isometric air conveyor having a first set of downstream louvers providing a downstream force vector of a first greater magnitude and a second set of upstream louvers providing an upstream force vector of a lesser magnitude for gently moving the containers downstream. These upstream and downstream force vectors create a low pressure area under each of the containers to maintain them in an upright position. This invention has enjoyed significant commercial success in the marketplace.

However, the container making industry continues to develop lighter weight articles having configurations which are even more unstable for transporting on air conveyors.

Specifically, the newest containers are taller, lighter and have variable diameters from top to bottom. Furthermore, the bottom surfaces are irregular. Thus, there is an ever increasing need for increased control and support for the containers to maintain them in an upright position as they are conveyed along an air conveyor from an upstream location to a downstream location.

SUMMARY OF THE INVENTION

In accordance with the present invention, an air conveyor is provided which has a first row of louvers extending laterally across the conveyor surface which includes upstream louvers directing air toward an upstream location and downstream louvers interspersed between the upstream louvers directing air to a downstream location. A second row of louvers extend laterally across the conveyor surface and is spaced longitudinally from the first row of louvers. This second row has upstream louvers directing air toward the upstream location and has downstream louvers directing air toward the downstream location interspersed between the upstream louvers. A majority of the upstream and downstream louvers of the first row are arranged so that they direct air in a direction opposite to corresponding longitudinally aligned upstream and downstream louvers of the second row. Additional rows are longitudinally spaced along the length of the air conveyor to provide a substantially uniform grid of opposing air flowing laterally across and longitudinally along the conveyor surface.

Conveniently, in one form of the invention, the louvers are lance and coined to provide a very smooth air conveyor surface and further serves the dual function of providing laminar air flow along the deck surface. This laminar flow creates a low pressure area under the containers to maintain them in an upright position, and further provides substantially vertical air flow to envelope the containers in vertical columns of air along their side walls to further assist in maintaining the containers in and upright position. In another form of the invention, the louvers are punched through the deck surface and have a generally trapezoidal shape which provide laminar air flow. Interspersed between the trapezoidal louvers are an array of vertical openings in the conveyor surface which provide substantially vertical air flow to envelope the side walls of the containers with air to assist in maintaining them in an upright position.

By varying the size of the louver openings and/or their spacing, extremely reliable and gentle movement of the containers along the conveyor surface from an upstream location to a downstream location can be accomplished with unstable, lightweight, upright containers. This is accomplished by simultaneously creating a low pressure area under the containers, while at the same time, enveloping the side walls of the containers with columns of air. Both functions operating together at the same time greatly stabilize these containers as they are moved along the conveyor from the upstream location to the downstream location. The invention can be used on both coverless and covered conveyors.

Additional advantages of this invention will become apparent from the description which follows, taken in conjunction with the accompanying drawings.

BRIEF DESCRIPTION OF THE DRAWINGS

FIG. 5 is an enlarged fragmentary plan view of a portion of the deck plate of FIG. 3, showing further details thereof;

FIG. 6 is an enlarged horizontal section, taken along line 6—6 of FIG. 5, showing the air flow through a lance and coined louver;

FIG. 7 is an enlarged horizontal section, taken along line 7—7 of FIG. 5, further showing the air flow through opposed louvers in adjacent longitudinal rows of louvers;

FIG. 8 is an enlarged horizontal section, taken along line 8—8 of FIG. 5, showing the air flow through opposed louvers in another adjacent longitudinal row of louvers;

FIG. 9 is a greatly enlarged fragmentary perspective view of a lance and coined louver;

FIG. 10 is a horizontal section, taken along line 10—10 of FIG. 9, showing the flow of air through the louver;

FIG. 11 is a greatly enlarged fragmentary perspective view of a trapezoidal punched louver with an array of vertical holes formed therearound;

FIG. 12 is a horizontal section, taken along line 12 of FIG. 11, showing the flow of air through the trapezoidal louver and through a vertical hole; and FIG. 13 is a horizontal section through the deck plate of FIG. 3 showing the utilization of this invention for conveying flanged containers;

BEST MODE FOR CARRYING OUT THE INVENTION

Figure 1:
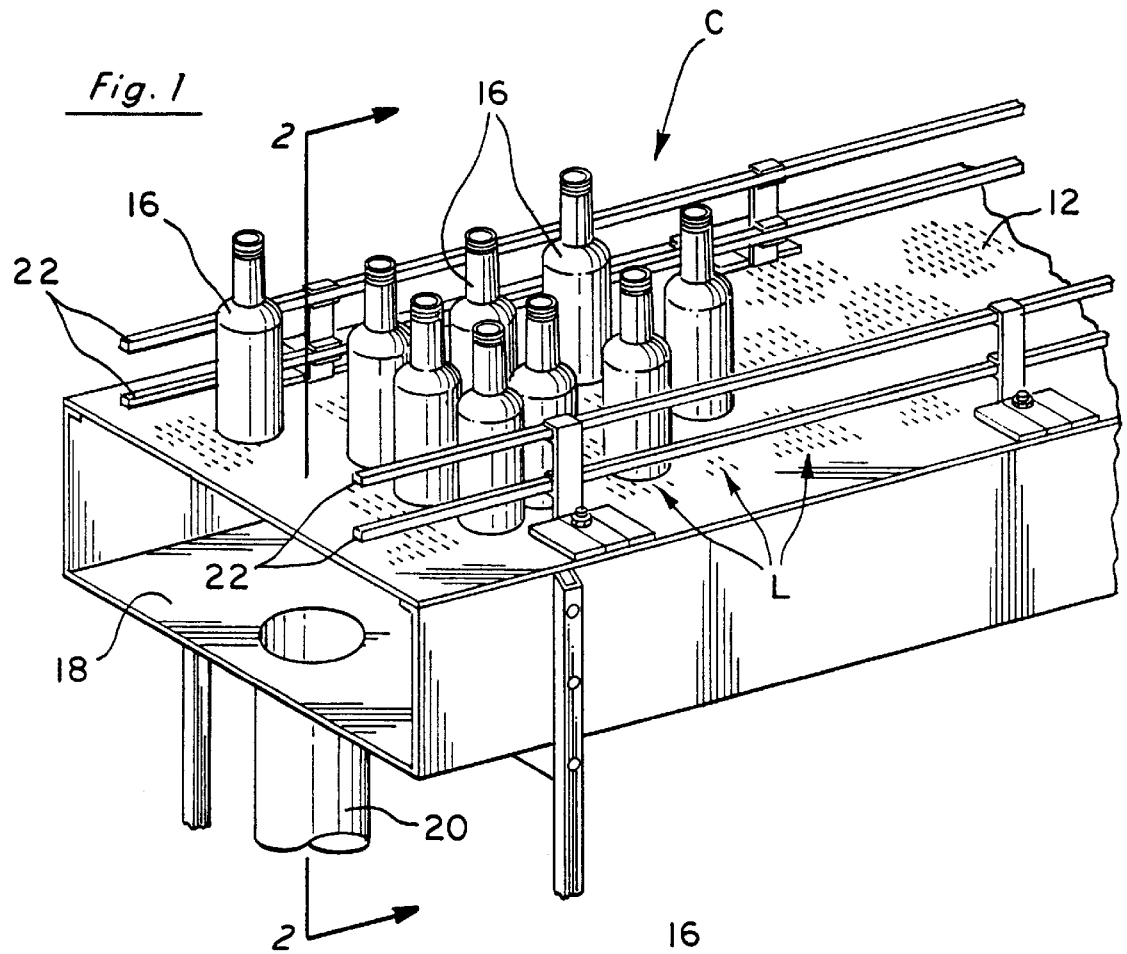
FIG. 1 is a fragmentary perspective view of an air conveyor constructed in accordance with this invention.
Figure 2:
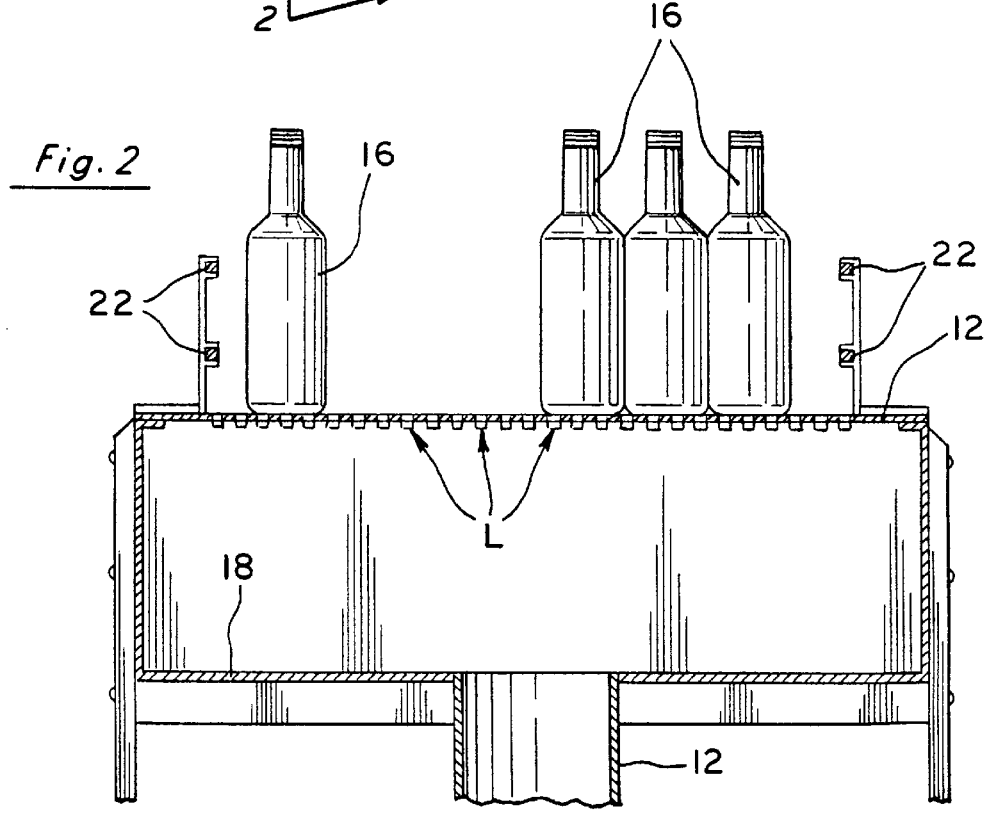
FIG. 2 vertical section, taken along line 2—2, showing further details of the air conveyor.
Figure 3:
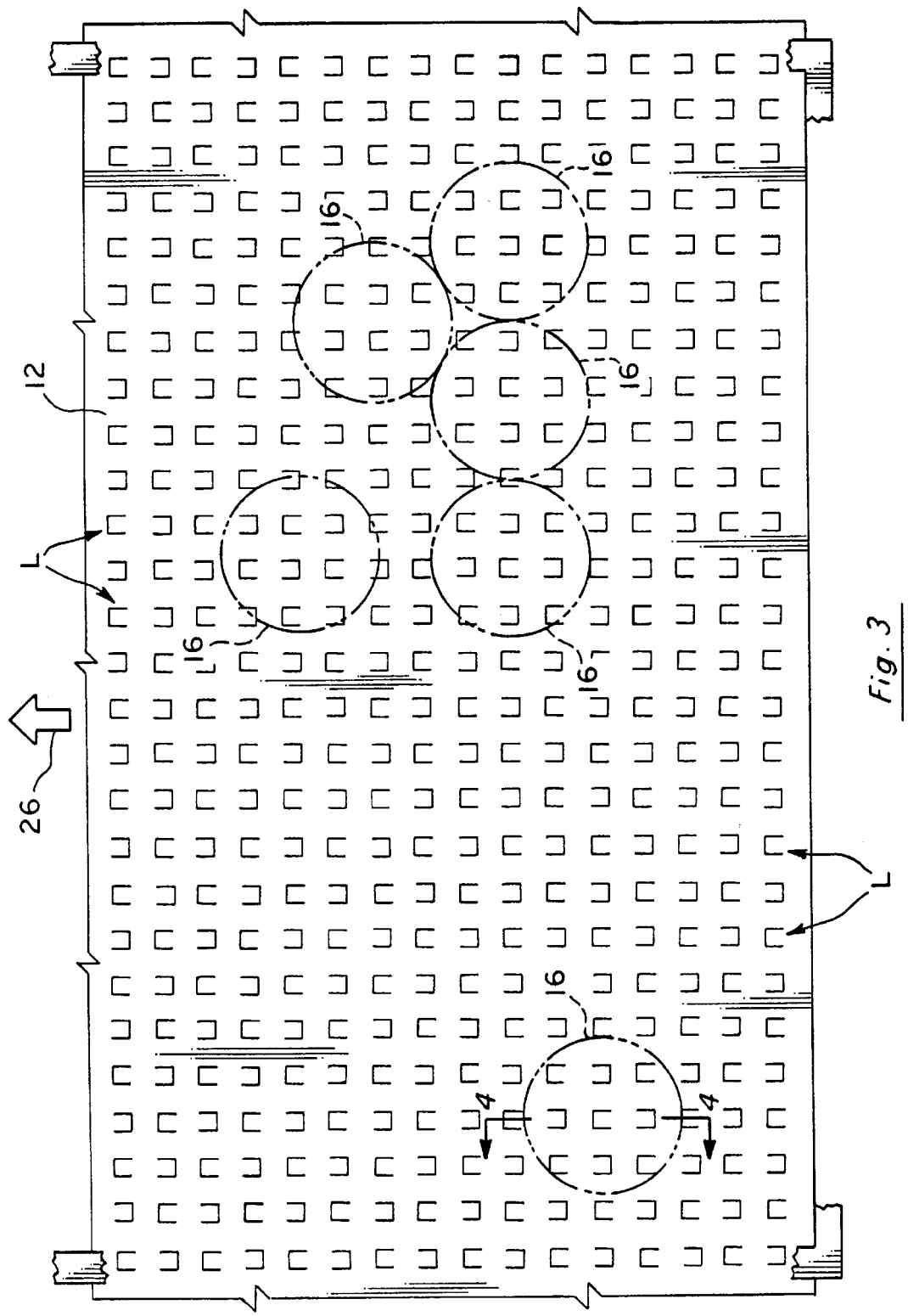
FIG. 3 is a fragmentary plan view of the deck plate of the air conveyor of FIGS. 1 and 2.
Figure 4:
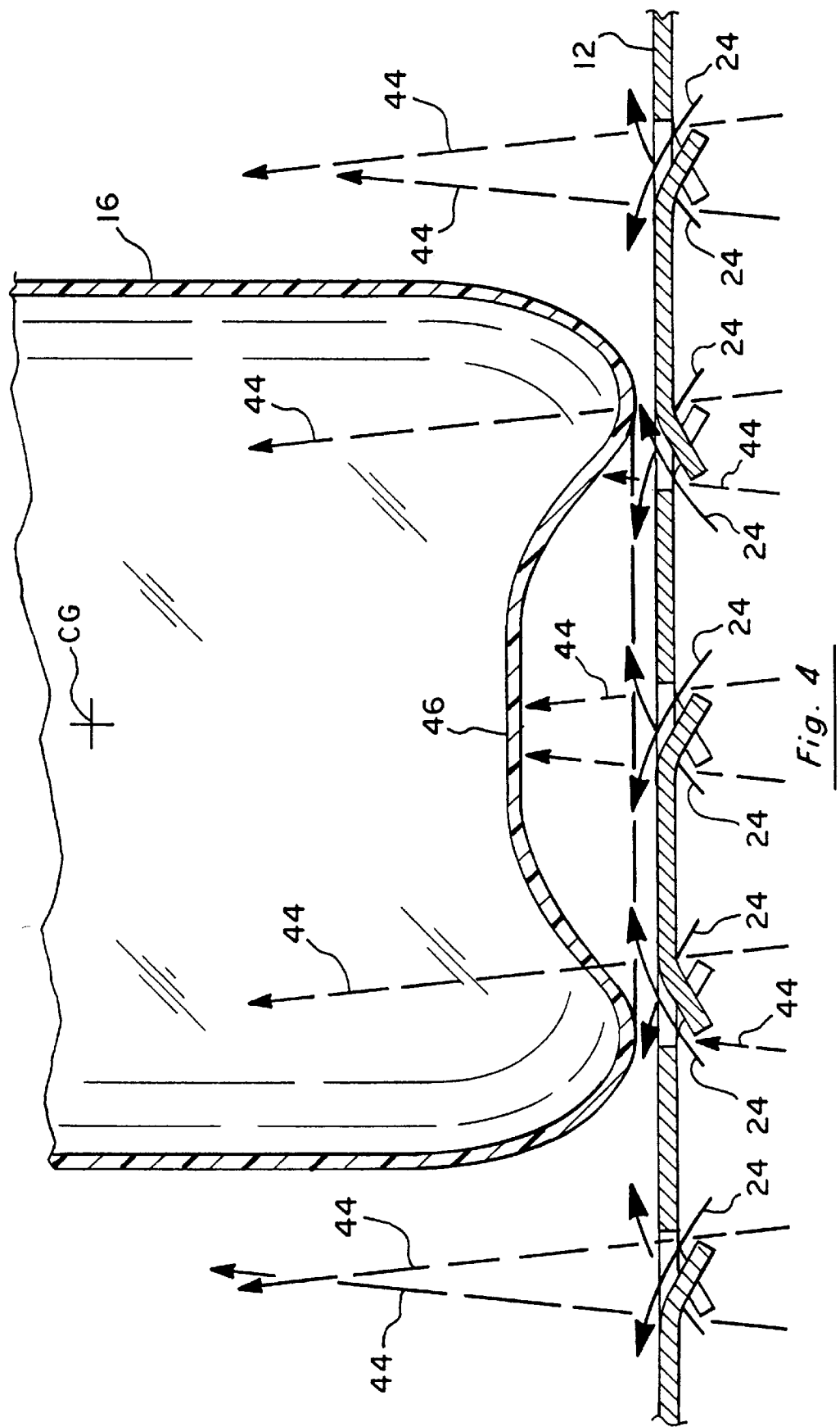
FIG. 4 is a greatly enlarged horizontal section taken along line 4—4 of FIG. 3 showing the flow of air beneath and along the side walls of a container.

In accordance with this invention, as seen in FIGS. 1–3, a conveyor C is provided which has a conveying surface in the form of a deck 12 with a plurality of louvers L therein for conveying lightweight containers 16 from an upstream location to a downstream location as will be more fully discussed below. A plenum 18 is attached to the bottom side of deck 12 and is supplied by air from a common air supply, such as a blower (not shown) through an inlet 20. Open rails 22 are provided along the outboard edges of deck 12 to hold the containers on the conveying surface. As seen in FIG. 4, the air passes through the louvers and due to the Coanda Effect, some of the air travels along the surface of the deck in the direction of arrows 24. The flow of air emitted from the louvers creates a low pressure area thereby holding the bottom 46 of container 16 closely adjacent the deck 12.

The principles of this feature of the invention are fully explained in my above-mentioned U.S. Pat. No. 5,549,423, whose disclosure is incorporated herein by reference. A variety of upstream and downstream louver arrangements are described and illustrated therein. In each arrangement, the downstream volume of air is greater than the upstream volume of air so that a net downstream force vector moves the containers from an upstream location to a downstream location. By varying the spacing and size of louver openings, very precise control of the movement of the containers is possible.

However, new containers have been designed which are even more difficult to transport along an air conveyor from an upstream location to a downstream location without tipping. These containers are typically very tall and slender, often varying in diameter from top to bottom and have irregular bottoms. Other containers have flanges at their upper and/or lower ends which have a tendency to ride up on each other, increasing the possibility that they will tip over. These containers require an extremely smooth deck surface and additional means for maintaining them in upright position beyond that provided by the low pressure area created under the containers due to the laminar flow of air across the deck surface. This additional means is accomplish by providing a vertical force vector of air which envelopes the side walls of the containers in vertical columns of air in the vicinity of their center of gravity to stabilize them as they move along the conveyor surface from the upstream location to the downstream location. This vertically flowing air may be thought of as vertical columns of air around each container. As the containers move along the conveyor surface from the upstream location to the downstream location, the louvers which provide the vertical air flow are constantly changing so that the vertical column of air around each container, in effect, moves longitudinally and laterally with the container as it moves laterally and longitudinally along the conveyor surface to provide continuous stabilization of the container throughout its travel along the conveyor surface. This flow of air tends to separate the containers from each other so that they flow gently downstream.

A particularly desirable deck plate construction is shown in FIGS. 3 and 5 wherein the containers move from the upstream location to the downstream location in the direction of arrow 26. The deck plate 12 comprises a plurality of laterally extending rows of alternating upstream and downstream louvers L. These rows form sets of upstream and downstream louvers. These sets are spaced longitudinally from each other and the lateral spacing of louvers L in each row is such that they are longitudinally aligned wherein a louver in one row directs air in a direction opposite to the corresponding longitudinally aligned louver of the next row. The number of downstream louvers can be greater than the number of upstream louvers to provide a net downstream force vector to move containers 16 from the upstream location to the downstream location. Alternatively, the size of the opening of the downstream louvers can be greater than that of the upstream louvers to provide a net downstream force vector for moving containers 16. Although the rows of louvers have been illustrated as having every other louver alternating in the upstream and downstream direction, it will be understood that a plurality of adjacent louvers can be directed either upstream or downstream as required for a particular conveying operation.

Louvers L are lance and coined from the deck 12 as best seen in FIGS. 9 and 10. The deck plate is cut along parallel lines to form an opening 28 having parallel side edges 30 and 32 joined to each other by a lateral edge 34 at radiuses 36 and 38, respectively. The tab formed by these cuts is bent downwardly to form a ramp 40. As best seen in FIGS. 6 and 10, the trailing end 42 of ramp 40 is longitudinally spaced from lateral edge 34 so that a generally vertical force vector of air can move upwardly in the direction of dashed arrow 44 in addition to the laminar flow of air in the substantially horizontal direction of arrow 24. Also air can flow around the edges of ramp 40 and flow upwardly in the direction of arrows 44 to add to the vertical force vector.

Turning to FIG. 4, it can be seen that the sets of louvers provide both upstream and downstream air volumes. The downstream volume of air is greater than the upstream volume of air so that the sets of louvers create substantially the same net amount of air volume directed to the downstream location at any incremental location from the upstream location to the downstream location. This causes the plurality of containers move at a controlled uniform speed along the conveyor surface. The vertically moving air envelopes the side wall of container 16 in vertical columns of air in the vicinity of its center of gravity CG to assist in stabilizing the container and maintaining it in an upright position as it moves laterally and longitudinally from the upstream location to the downstream location.

In summary, the upstream and downstream force vectors of laminar flowing air in the direction of arrows 24 creates a low pressure area under the portions of the container's bottom 46 which are adjacent deck plate 12 to hold container 16 in upright position and simultaneously the force vectors of vertical air flowing in the direction of arrows 44 envelopes the side walls of container 16 to also assist in holding it in an upright position. Thus, unstable upright containers, such as container 16, can be moved from an upstream location to a downstream location gently and without tipping.

A trapezoidal louver L' is shown in FIGS. 11 and 12. Because the ramp 50 is closed along its side edges, opening 52 only permits laminar air flow in the direction of arrow 24. Thus, the use of trapezoidal louvers L' alone will not provide the dual function that is possible by using the lance and coined louvers L previously described. However, by providing an array of vertical openings 54 in deck plate 12', a vertical force vector of air can be provided in the direction of arrow 44 to envelope the side walls of the containers in vertical columns of air to assist in holding them in an upright position. Although a particular arrangement of vertical openings 54 is illustrated in FIG. 11, it will be understood that any pattern of vertical openings which provides the desired result is contemplated within this invention.

Containers which have flanges at their bottoms and/or tops tend to ride up on each other as illustrated in FIG. 13. Thus, containers 56, which have lower peripheral flanges 58 and are moving in the direction of arrow 60, may ride up on each other as shown. However, by providing louvers L in deck plate 12, as previously described, the air provided along a vertical force vector, designated by arrows 44, will envelope the side walls of containers 56 causing them to separate from each other and remain in an upright position so that the leading edge of the lower peripheral flange 58 will not "trip" on the deck plate causing the container 56 to fall over.

Figure 14:
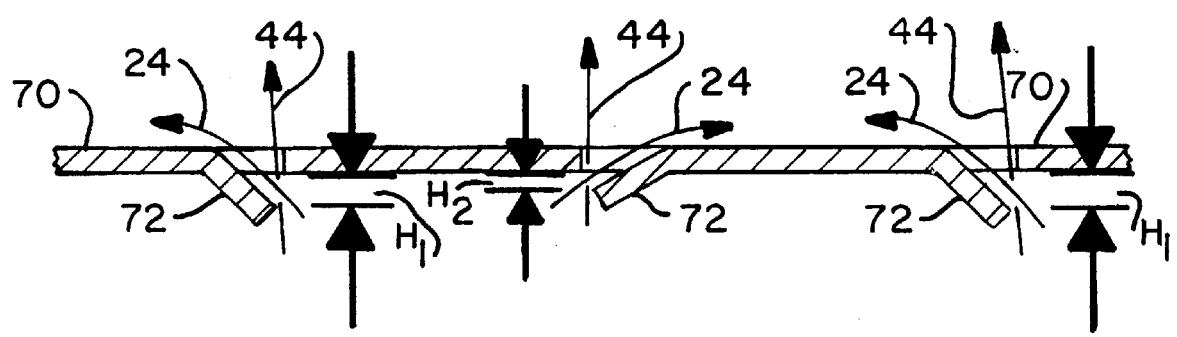
FIG. 14 is an enlarged horizontal section of another deckplate, showing airflow through opposed louvers in adjacent longitudinal rows of louvers, and further showing downstream directed louvers having greater louver areas than upstream directed louvers.

FIG. 14 illustrates an enlarged horizontal section of another deckplate 70, similar to FIG. 7, but showing airflow through opposed louvers in adjacent longitudinal rows or louvers wherein the downstream directed louvers have greater louver areas than upstream directed louvers. The areas of the louvers can be increased or decreased by the varying height of the louver openings. The height of the louver openings is modified by changing the angles at which ramps 72 extend from the deckplate 70. As shown, the downstream directed louvers have a larger height $H_1$ while the upstream directed louvers have a smaller height $H_2$. By modifying the height by a few thousands of an inch, the volume of air dispersed from the louvers can be controlled.

From the foregoing, the advantages of this invention are readily apparent. A method and apparatus has been provided which serves the dual function of creating a low pressure area under unstable upright containers to hold them in an upright position while simultaneously enveloping the side walls of the containers in vertical columns of air which moves along a substantially vertical force vector to further assist in holding them in an upright position as they move from an upstream location to a downstream location. This is accomplished by the use of lance and coined louvers arranged in a predetermined pattern to provide both upstream and downstream force vectors of air as well as substantially vertical force vectors of air. Alternatively, an array of trapezoidal louvers can be used in conjunction with an interspersed array of vertical openings in a deck plate to provide the same dual function.

This invention has been described in detail with reference to particular embodiments thereof, but it will be understood that various other modifications can be effected within the spirit and scope of this invention.

What is claimed is:

1. An air conveyor for conveying articles from an upstream location to a downstream location comprising:
    a conveyor surface;
    a first row of louvers extending laterally across said conveyor surface, said first row having an upstream side and an downstream side, said first row further having upstream louvers directing air toward the upstream location, and having downstream louvers directing air toward the downstream location, said downstream louvers being interspersed between said upstream louvers in said first row; and
    a second row of louvers extending laterally across said conveyor surface and spaced longitudinally from said first row at said upstream side, said second row of louvers having upstream louvers directing air toward the upstream location, and having downstream louvers directing air toward the downstream location, said downstream louvers of said second row being interspersed between said upstream louvers in said second row;
    wherein at least a majority of said upstream and downstream louvers of said first row are longitudinally aligned with downstream and upstream louvers of said second row so that air directed through said longitudinally aligned louvers of said first and second rows are directed opposite to one another.

2. An air conveyor, as claimed in claim 1, further including:
    a third row of louvers extending laterally across said conveyor surface and spaced longitudinally from said first row at said downstream side, said third row of louvers having upstream louvers directing air toward the upstream location, and having downstream louvers directing air toward the downstream location, said downstream louvers of said third row being interspersed between said upstream louvers of said third row;
    wherein at least a majority of said upstream and downstream louvers of said third row are arranged so that they direct air in a direction opposite to corresponding longitudinally aligned louvers of said first row.

3. An air conveyor, as claimed in claim 1, wherein:
    said first and second rows of louvers create a substantially uniform grid of opposing air flows laterally across and longitudinally along said conveyor surface.

4. An air conveyor, as claimed in claim 1, wherein:
    said downstream louvers of said first and second rows have a greater louver area than said upstream louvers of said first and second rows.

5. An air conveyor, as claimed in claim 1, further including:
    a common plenum connectable to a source of air under pressure and attached to an underside of said conveyor surface for supplying the air under pressure.

6. An air conveyor, as claimed in claim 1, wherein:
    said louvers are lance and coined louvers.

7. An air conveyor, as claim in claim 1, wherein:
    said upstream louvers and said downstream louvers of said first and second rows of louvers each provides a laminar flow of air along said conveyor surface to create a low pressure area under the articles to hold them in an upright position and each provides a vertical force vector of air so that the articles are enveloped in air to assist in holding them in the upright position.

8. An air conveyor for conveying articles from an upstream location to a downstream location comprising:
    a conveyor surface; and
    a plurality of rows of louvers for directing airflow in a desired direction along said conveyor surface, said rows of louvers extending laterally across said conveyor surface and spaced from one another longitudinally along said conveyor surface, said rows of louvers having upstream and downstream louvers in each row of said plurality of rows, said upstream and downstream louvers being spaced from one another laterally across said conveyor surface so that said upstream and downstream louvers in said rows of louvers are aligned longitudinally along said conveyor surface;
    wherein a majority of said upstream and downstream louvers in each said row directs the airflow in a direction opposite longitudinally aligned downstream and upstream louvers in an adjacent said row.

9. A method of conveying articles on an air conveyor from an upstream location to a downstream location, said method comprising the steps of:
    directing air along a conveyor surface in upstream and downstream directions through a first row of louvers extending laterally across the conveyor surface;
    directing air along the conveyor surface in upstream and downstream directions through a second row of louvers extending laterally across the conveyor surface;
    aligning the first and second rows of louvers so that a majority of louvers in the first row direct air in a direction opposite to said louvers in the second row that are longitudinally aligned with said louvers in the first row; and
    moving the articles at a controlled speed from the upstream location to the downstream location.

10. A method, as claimed in claim 9, including the further step of:
    further directing air in a substantially vertical direction through the first and second rows of louvers to envelop the articles in vertical columns of air which hold them in an upright position as they are conveyed from the upstream location to the downstream location.

11. A method, as claim in claim 9, including the further step of:
    further directing air in a substantially vertical direction through an array of openings interspersed between the first and second rows of louvers to envelop the articles in vertical columns of air which hold them in an upright position as they are conveyed from the upstream location to the downstream location.

12. A method of conveying a plurality of unstable, upright, lightweight containers, wherein each container has a side wall, supporting bottom surface, and a center of gravity, at a controlled speed along an air conveyor from an upstream location to a downstream location, said method comprising the steps of:

providing a conveying surface having louvers through which air is supplied for moving the containers along the conveying surface from the upstream location to the downstream location;

supplying air through a plurality of the louvers along a downstream vector having a first greater magnitude;

supplying air through a plurality of the louvers along an upstream vector having a second lesser magnitude;

supplying air through a plurality of openings along a substantially vertical vector;

positioning the plurality of containers on the conveyor surface at the upstream location for conveying to the downstream location, the bottom surface of each container being of sufficient size to simultaneously cover louvers along the upstream and downstream vectors on the conveyor surface;

supplying the air to the louvers from a source of air at a pressure and volume sufficient to elevate the plurality of containers above the conveyor surface;

directing the air through the louvers which are arranged in laterally extending rows of louvers, the air being directed in a direction substantially parallel to the conveyor surface to create a first low pressure area between the bottom surface of each container and the conveyor surface to hold them in an upright position and in close proximity to the conveyor surface;

enveloping the walls of the respective containers in vertical columns of air directed along the vertical vector to assist in holding them in an upright position, said vertical columns of air supplied by the vertical openings surrounding and spaced from selected louvers of said laterally extending rows, wherein in each laterally extending row, a set of openings creating and substantially vertical force vectors are spaced closer to said sets of louvers in said row than sets of louvers in an adjacent row; and moving the plurality of containers from the upstream location to the downstream location along the conveyor via the air flow created by a difference in the first magnitude vector and the second magnitude vector.

13. A method, as claimed in claim 12, wherein:
the side walls of the respective containers are enveloped with air in a vicinity of the center of gravity thereof.

14. A method, as claimed in claim 12, wherein the step of directing the air includes the further steps of:
providing a first set of perforations extending through the conveyor surface at an incline so that air passing therethrough has a downstream vector of the first greater magnitude; and providing a second set of perforations extending through the conveyor surface at an incline so that air passing therethrough has an upstream vector of the second lesser magnitude, said first and second sets of perforations being arranged in a predetermined alternating arrangement.

15. A method, as claimed in claim 14, including the further step of:
passing the air along the vertical vector through said first and second sets of louvers, respectively.

16. An air conveyor apparatus having an upstream end and a downstream end, said apparatus comprising:
a conveyor surface extending from said upstream end to said downstream end;

a plurality of unstable, upright, lightweight containers, each having a center of gravity, a side wall, and a bottom surface positioned above said conveyor surface;

means for creating upstream and downstream force vectors of air above said conveyor surface which support said plurality of containers above said conveyor surface, the upstream and downstream force vectors of air producing a first low pressure area under each of said plurality of containers to maintain them in an upright position for movement at a controlled speed from said upstream end to said downstream end without tipping, said means for creating includes a first set of louvers creating the downstream force vectors, and a second set of louvers creating the upstream force vectors, said first and second sets being arranged in laterally extending rows; and means for creating substantially vertical force vectors of air above said conveyor surface to envelop said side walls of said containers in vertical columns of air to additionally minimize tipping as they move from said upstream end to said downstream end, said means for creating substantially vertical force vectors includes a set of openings surrounding and spaced from said rows of first and second sets of louvers, wherein in each laterally extending row, a set of openings creating said substantially vertical force vectors are spaced closer to said sets of louvers in said row than sets of louvers in an adjacent row.

17. An air conveying apparatus, as claimed in claim 16, wherein said means for creating downstream and upstream force vectors and said means for creating vertical force vectors includes:
a first set of louvers for creating the downstream force vectors and some of the vertical force vectors; and a second set of louvers for creating the upstream force vectors and the rest of the vertical force vectors.

18. An air conveying apparatus, as claimed in claim 17, further including:
a common plenum connectable to a source of air under pressure and attached to said underside of said conveyor surface for supplying air under pressure to said first and second sets of louvers.

19. An air conveying apparatus, as claimed in claim 17, wherein:
said first and second set of louvers create substantially a same net amount of air volume directed toward the downstream location at any incremental location from the upstream location to the downstream location so that said plurality of containers move at a controlled uniform speed therealong.

20. An air conveying apparatus, as claimed in claim 18, wherein:
said first and second sets of louvers create substantially a same amount of air volume directed to the downstream end at any incremental location from the upstream end to the downstream end so that said plurality of containers move at a controlled uniform speed therealong.

21. An air conveying apparatus, as claimed in claim 18, further including:
a common plenum connectable to a source of air under pressure and attached to an underside of said conveyor surface for supplying air under pressure to said first and second sets of louvers and to said additional set of openings.

22. In combination, a plurality of unstable upright lightweight containers, each having a center of gravity, a side wall and a bottom surface, and a conveyor for conveying said plurality of lightweight containers by air supplied under pressure thereto, said combination comprising:

a conveyor having a surface extending from an upstream location to a downstream location for moving said plurality of containers en masse therealong;

said bottom surface of each of said plurality of containers positioned in fluid communication with said conveyor surface; and a first and second set of louvers extending through said conveyor surface for creating downstream and upstream force vectors of air, respectively, that form a low pressure area under each a said plurality of containers to maintain them in an upright position for downstream movement, said upstream and downstream sets of louvers also creating a substantially vertical force vector to envelope said side walls of said respective containers in vertical columns of air to minimize tipping, said first and second sets of louvers being arranged in a predetermined row arrangement on said conveyor surface to enable controlled movement of said plurality of containers at a controlled speed from the upstream location to the downstream location.

23. The combination, as claimed in claim 22, wherein:

said first and second set of louvers create substantially the same amount of air volume directed to the downstream location at any incremental location from the upstream location to the downstream location so that said plurality of containers move at a controlled uniform speed therealong.

24. The combination, as claimed in claim 22, wherein:

said first set of louvers has a greater total open area than said second set of louvers through which the air under pressure flows, enabling controlled movement of said plurality of containers.

25. The combination, as claimed in claim 22, wherein:

said first and second set of louvers are lance and coined to create said respective upstream and downstream force vectors and said vertical force vector.

26. The combination, as claimed in claim 22, wherein:

each said louver of said set of upstream louvers and said set of downstream louvers comprises a ramp cut from said deck surface and formed at an angle to said conveyor surface to provide said respective upstream and downstream force vectors and wherein said ramp has a trailing end spaced from an edge formed in said deck surface from which said ramp is cut to create said vertical force vector.

27. In combination, a plurality of unstable, upright, lightweight containers, each having a center of gravity, a side wall, and a bottom surface, and a conveyor for conveying said plurality of lightweight containers by air supplied under pressure thereto, said combination comprising:

said conveyor having a surface extending from an upstream location to a downstream location for moving said plurality of containers en masse therealong;

said bottom surface of each of said plurality of containers being positioned in fluid communication with said conveyor surface;

a first set and a second set of louvers extending through said conveyor surface for creating downstream and upstream force vectors of air, respectively, that form a low pressure area under each of said plurality of containers to maintain them in an upright position for downstream movement, said first and second sets of louvers being arranged in a predetermined row arrangement on said conveyor surface to enable controlled movement of said plurality of containers at a controlled speed from the upstream location to the downstream location; and a set of vertical openings through said conveyor surface to create a substantially vertical force vector to envelop said walls of said respective containers in vertical columns of air to minimize tipping, said vertical openings being arranged in groups of openings surrounding and spaced from selected louvers of said first and second sets, wherein in each row, a set of openings creating said substantially vertical force vectors are spaced closer to said sets of louvers in said row than sets of louvers in an adjacent row.

* * * * *